(12) United States Patent
Yule et al.

(10) Patent No.: US 7,010,021 B2
(45) Date of Patent: Mar. 7, 2006

(54) METHOD OF GENERATING A TIME SHIFTED SIGNAL

(75) Inventors: Andrew T. Yule, East Grinstead (GB); Amites Sarkar, Crawley (GB); Bryan D Young, Wallington (GB); Martin S. Wilcox, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 778 days.

(21) Appl. No.: 09/961,983

(22) Filed: Sep. 24, 2001

(65) Prior Publication Data

US 2002/0061055 A1   May 23, 2002

(30) Foreign Application Priority Data

Sep. 23, 2000  (GB) .................................... 0023365
Oct. 14, 2000  (GB) .................................... 0025224

(51) Int. Cl.
*H04B 1/69* (2006.01)
(52) U.S. Cl. ..................................................... 375/149
(58) Field of Classification Search ................ 375/130, 375/134, 136, 137, 142, 144, 150, 149; 370/320, 370/335, 342, 441
See application file for complete search history.

(56) References Cited

U.S. PATENT DOCUMENTS

| | | | | |
|---|---|---|---|---|
| 6,151,353 A * | 11/2000 | Harrison et al. | ............ | 375/136 |
| 6,160,841 A * | 12/2000 | Stansell et al. | ............. | 375/148 |
| 6,163,567 A * | 12/2000 | Hatch | .......................... | 375/149 |
| 6,327,298 B1 * | 12/2001 | Grobert | ...................... | 375/148 |
| 6,366,599 B1 * | 4/2002 | Carlson et al. | ............. | 375/130 |
| 6,493,378 B1 * | 12/2002 | Zhodzishsky et al. | ...... | 375/149 |
| 6,516,021 B1 * | 2/2003 | Abbott et al. | ............... | 375/150 |
| 6,531,982 B1 * | 3/2003 | White et al. | ........... | 342/357.09 |

\* cited by examiner

*Primary Examiner*—Emmanuel Bayard

(57) ABSTRACT

A time shifted replica signal (SLS) is generated from a reference signal (SPS) including a series of samples (A to K) describing bits of a data message, the sampling rate being at least twice the data message bit rate. The phases of the reference signal samples are determined with respect to virtual epochs (41) of the data message bits of the reference signal (SPS). The time shifted replica signal (SLS) is composed from the reference signal samples as a function of the phases of the reference signal samples. In another embodiment, the time shifted replica signal (SLS) is composed from the reference signal samples (A to K), the sampling rate of the replica signal (SLS) being the same as that of the reference signal (SPS), at least one reference signal sample (A to K) not being present in the time shifted replica signal (SLS).

22 Claims, 3 Drawing Sheets

METHOD OF GENERATING A TIME SHIFTED SIGNAL

This invention relates to a method of generating a time shifted replica signal from a reference signal comprising a series of samples describing data message bits, and to a signal generator for the same. The invention further relates to a spread spectrum signal receiver comprising such a signal generator and, in particular, a GPS receiver.

Methods of generating a time shifted replica signal from a reference signal in the digital domain are known and, by way of example, two such methods will be described. First, a very simple method is to replicate the reference signal whereby the replica signal is time shifted by a fixed number of samples. However, such a method will not accommodate a small time shift unless the sampling rate is high and a high sampling rate typically requires complex signal processing circuitry having a high power consumption.

At chapter 5 (GPS satellite signal acquisition and tracking) of GPS Principles and Applications (Editor, Kaplan) ISBN 0-89006-793-7 Artech House, a second method is disclosed in relation to generating early and late replica PRN code signals for despreading GPS spread spectrum signals. Prompt PRN codes are generated in a code generator of a GPS receiver and time shifted, early and late replica codes are generated therefrom. This is achieved in real-time by storing the previous, current and next sample of a prompt code in a shift register and in order to generate a delay equal to half the sample rate, a residual code-phase measurement from a numerically-controlled oscillator (NCO) is used to generate a clock signal at twice the sample rate which is then used to clock the shift register. By tapping into the contents of the shift register two signals can be generated, an early signal which is delayed by half a chip period relative to the prompt signal, and a late signal which is half a chip ahead of the prompt signal, a late signal. If a smaller delay were required, a higher clock rate and a longer shift register would be needed.

It is an object of the present invention to provide a method of generating a time shifted replica signal from a reference signal comprising a series of samples describing bits of a data message in which the sampling rate is greater than the data message bit rate, and a signal generator for the same.

It is a further object of the present invention to provide a method of despreading a target spread spectrum signal containing a pseudorandom noise (PRN) code, and a spread spectrum signal receiver, especially a GPS receiver, for the same.

According to a first aspect of the present invention, such a method of generating a time shifted replica signal and a signal generator for the same are provided, the method comprising the steps of determining the phases of the reference signal samples with respect to virtual epochs of the data message bits of the reference signal, the sampling rate of the replica signal preferably being the same as that of the reference signal; and composing the time shifted replica signal from the reference signal samples as a function of the phases of the reference signal samples.

Such a method enables a time shifted signal to be generated which is time shifted by only a small amount without requiring high sampling or clocking rates, including by an amount not equal to an integer multiple of the time period between adjacent samples, and by an amount less than the time period between adjacent samples.

NB. "virtual" epochs of the data message bits is intended to refer to those epochs of the data message bits that would exist if the data message was described by a sample stream with an infinite sampling rate, or an equivalent analogue signal. In other words, the epochs of a signal that would exist but for sampling discontinuity, for example, as represented by features 41 of FIG. 4. Such virtual epochs can be established by averaging the position of a series of sampled bit epochs. Also, the term "sample" is not intended to be limited to an instantaneous value taken from an analogue signal but includes digitally generated values used to compose a signal.

Preferably, the phases of the reference signal samples may be used to determine which signal samples are to be used to compose the time shifted replica signal, for example, such that at least one reference signal sample is not present in the time shifted replica signal.

According to a second aspect of the present invention, a further method of generating a time shifted replica signal is provided comprising the step of composing the time shifted replica signal from the reference signal samples, wherein the sampling rate of the replica signal is the same as that of the reference signal, and wherein at least one reference signal sample is not present in the time shifted replica signal.

As with a method according to the first aspect of the present invention, such a method enables a time shifted signal to be generated which is time shifted by an amount not equal to an integer multiple of the time period between adjacent samples, and by an amount less than the time period between adjacent samples.

In methods according to both the first and second aspects of the present invention, at least one reference signal sample may be replicated twice in succession in the time shifted replica signal. Such replication may be used in circumstances where it is necessary to insert an addition sample in the replica signal for which there is no corresponding sample in the reference signal.

Also, at least one pair of adjacent replica signal samples positioned either side of a virtual data bit epoch in the time shifted replica signal may correspond to a pair of non-adjacent reference signal samples positioned either side of the virtual data bit epoch in the reference signal. This may occur when addition sample is inserted in the replica adjacent a data bit epoch.

Ideally, to 95%, 95% and 99% accuracy, a fraction having the data message bit rate as the numerator and the sampling rate as the denominator can be expressed by a continued fraction expansion in which the largest integer is less than or equal to 12, 26 or 26 respectively.

Of course, the reference signal samples may equally describe a pseudorandom noise (PRN) code whereby the data message bits correspond to the PRN code chips.

According to a third aspect of the present invention, there is provided a method of despreading a target spread spectrum signal containing a pseudorandom noise (PRN) code, and a spread spectrum signal receiver for the same. The method comprises the steps of generating a reference signal comprising a series of samples describing a PRN code corresponding to that contained in the target signal and in which the sampling rate is at least twice the PRN code chipping rate; generating time shifted, early and late replica signals from the reference signal by a method in accordance with the first and second aspect of the present invention; and correlating the target signal with the time shifted, early and late replica signals. This can be for the purposes of determining whether the PRN code has been acquired or for establishing code phase error in a tracking loop, say using an early-minus-late correlation architecture.

Also, it is preferable that any such code phase measurement of the target spread spectrum signal is adjusted to compensate for error in the generated time shifted, early and late replica signals compared to respective ideal early and late replica signals.

According to a fourth aspect of the present invention, there is provided a spread spectrum signal receiver for despreading a spread spectrum signal comprising a receiver for receiving a target spread spectrum signal containing a pseudorandom noise (PRN) code; a signal generator for generating a reference signal comprising a series of samples describing a PRN code corresponding to that contained in the target signal and in which the sampling rate is at least twice the PRN code chipping rate, and generating time shifted, early and late replica signals from the reference signal by a method in accordance with the first and second aspects of the present invention; and a correlation processor for correlating the target signal with the time shifted, early and late replica signals.

The above and other features and advantages of the present invention will be apparent from the following description, by way of example, of an embodiment of a GPS receiver according to the present invention with reference to the accompanying drawings in which.

Figure 2:
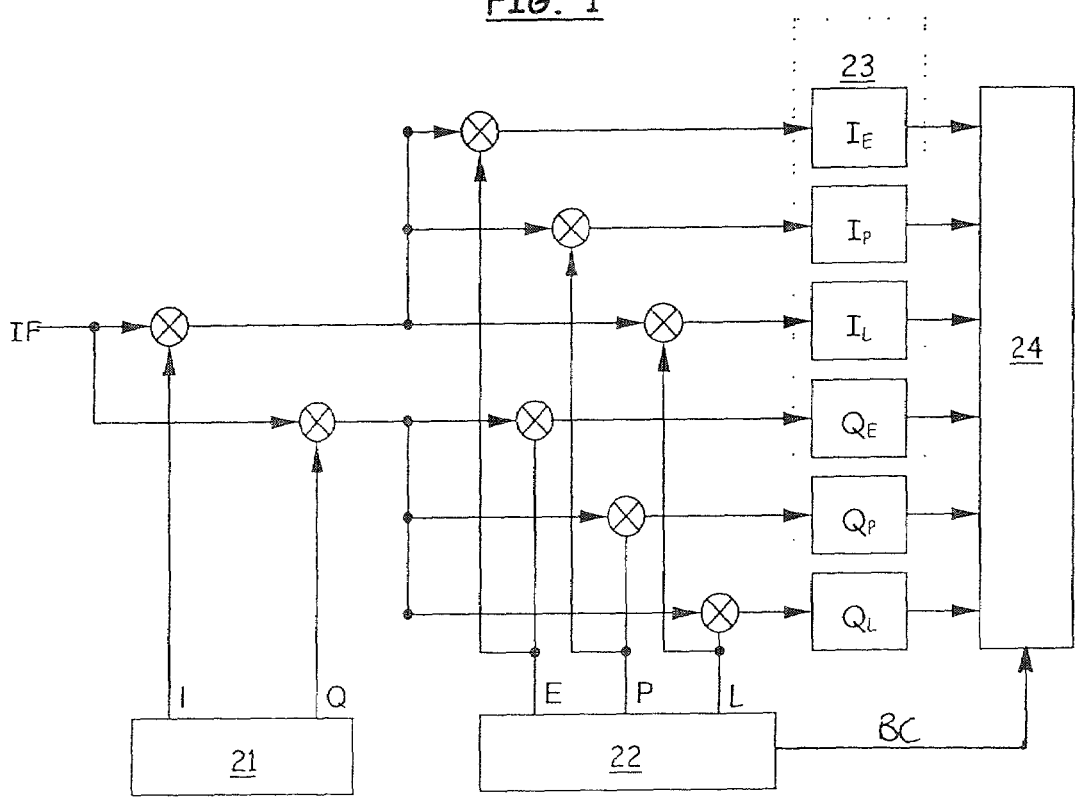
FIG. 2 shows, schematically, a receiver channel co-operating with the receiver processor of the GPS receiver of FIG. 1.
Figure 3:
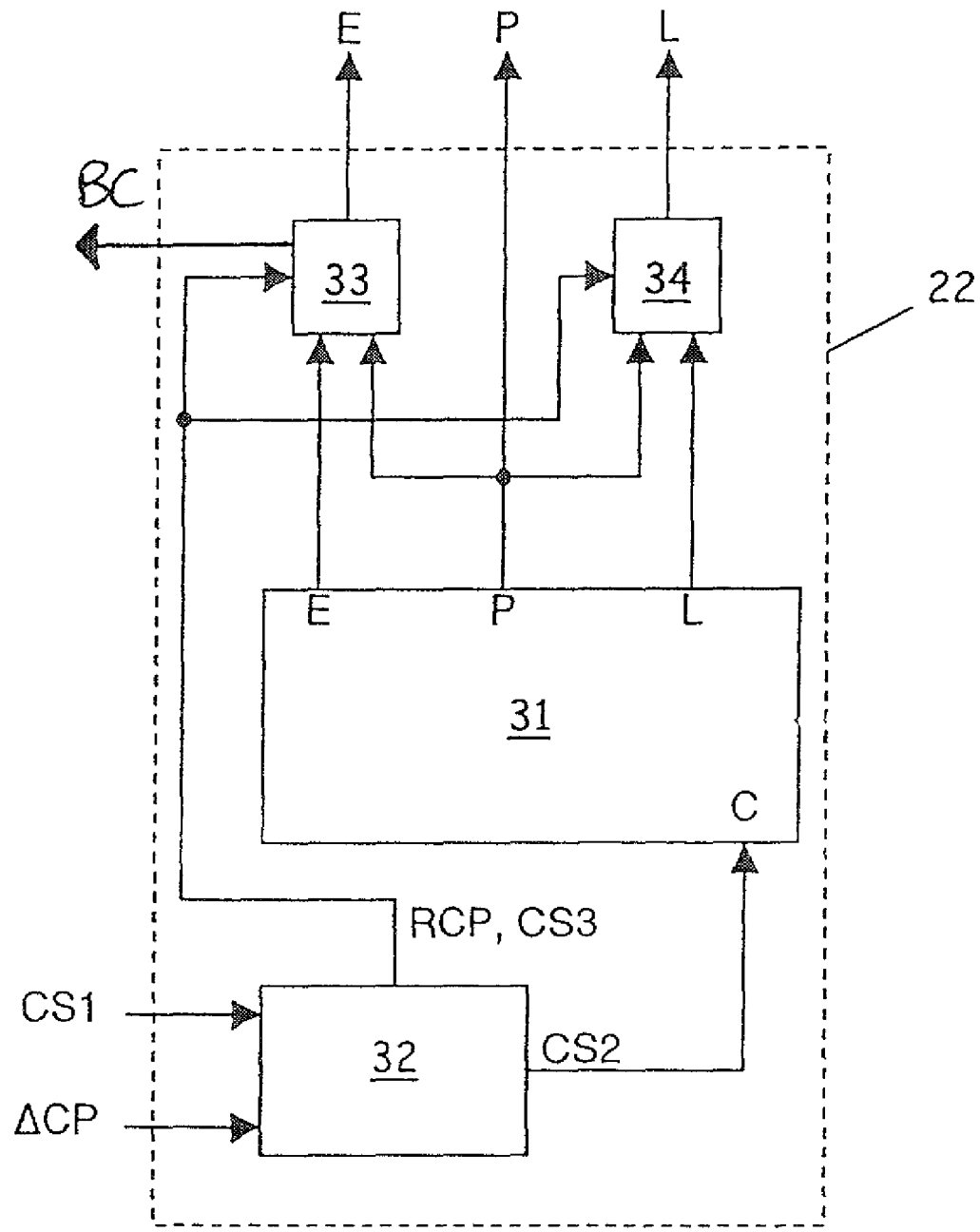
FIG. 3 shows, schematically, the replica code generator of the receiver channel of FIG. 2 in greater detail.
Figure 4:
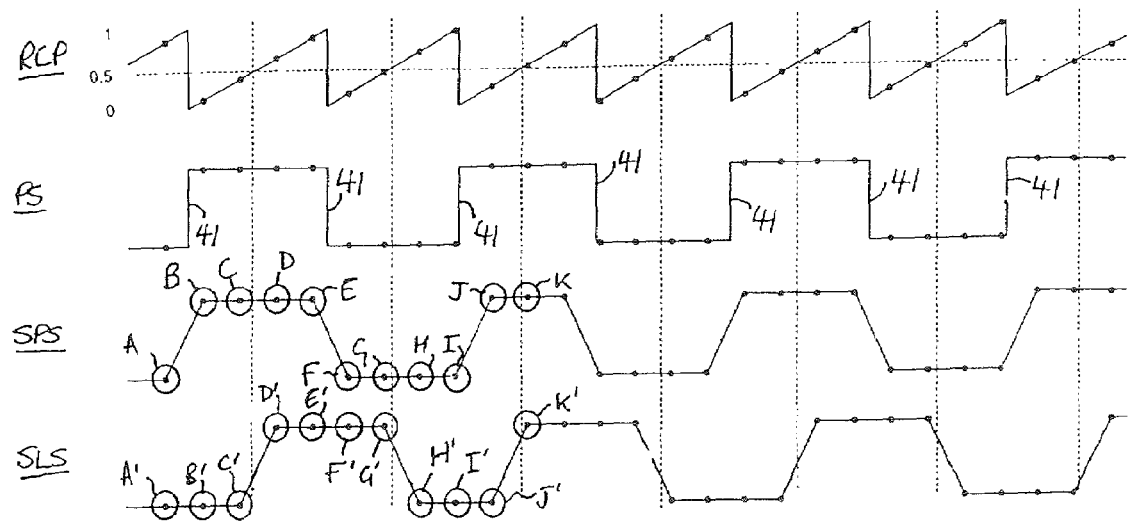
Figure 5:
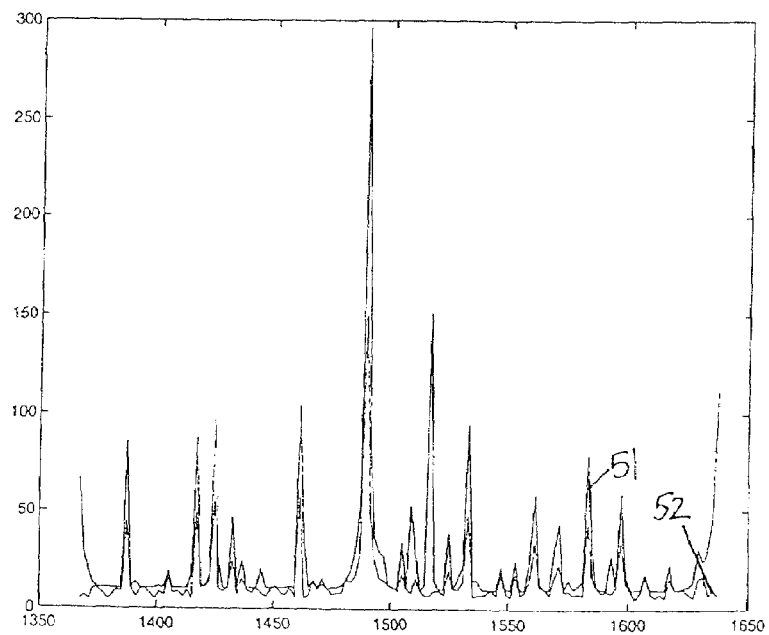

FIG. 4 illustrates the method of early and late replica PRN code generation used in the replica code generator shown in FIGS. 2 and 3; and FIG. 5 illustrates the relationship between the largest integer in the continues fraction expansion of a fraction having the data message bit rate of a signal as the numerator and the sampling rate of the signal as the denominator, and the distribution of samples describing the data message bit in the signal.

Figure 1:
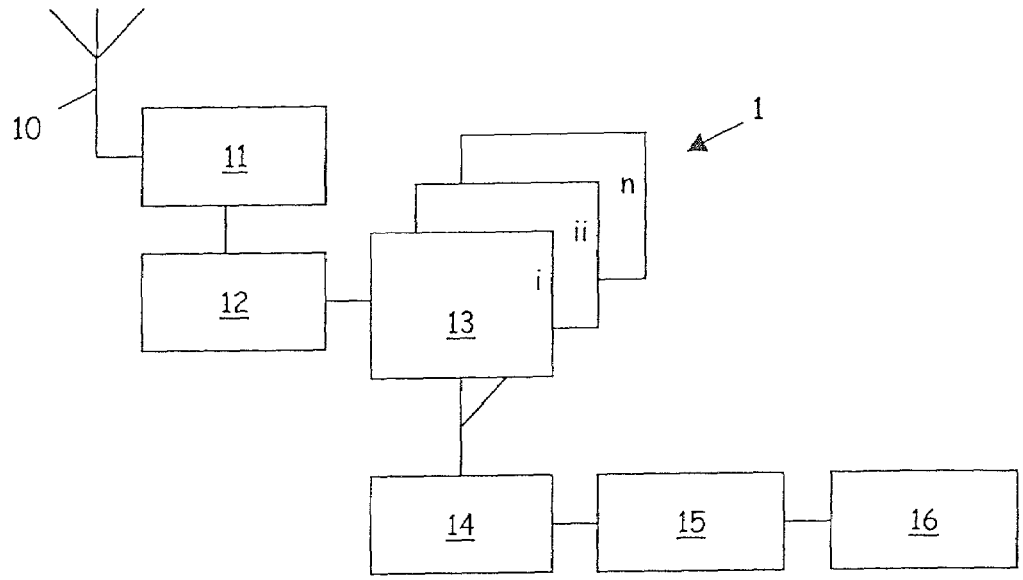
FIG. 1 shows, schematically, a GPS receiver according to the present invention.

FIG. 1 shows, schematically, the architecture of a GPS receiver 1 according to the present invention. When operative, the GPS receiver receives NAVSTAR GPS signals through an antenna 10 and pre-process them in an RF signal pre-processor 11, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a first in-first out (FIFO) memory 12. From the memory, the samples may be fed at any time later into each of a series of parallel receiver channels 13. The satellite signals are acquired and tracked in respective digital receiver channels in co-operation with the receiver processor 14 for the purpose of acquiring pseudorange information. Such methods for acquisition and tracking are well known, for example, see chapter 4, GPS satellite signal characteristics, and chapter 5, GPS satellite signal acquisition and tracking, Kaplan ibid. Using the acquired pseudorange information, the navigation processor 15 calculates the position of the receiver using conventional algorithms and that position is displayed on a display 16 to the user.

FIG. 2 shows, schematically, the receiver channel co-operating with the receiver processor in greater detail. In order to retrieve pseudorange information from the signal samples stored in the memory 12, a carrier wave must be removed and this is done by the receiver generating in-phase (I) and quadrature phase (Q) replica carrier wave signals using a carrier wave generator 21. A carrier wave phase lock loop (PLL) is normally employed to accurately replicate the frequency of the received carrier wave whereby the correlation processor 24 provides the carrier wave generator with carrier phase incremental adjustments each clock cycle to maintain carrier phase lock. In order to acquire the PRN codes, early (E), prompt (P) and late (L) replicas of the incoming PRN codes are continuously generated by a replica code generator 22. The replica codes are then correlated with the I and Q signals to produce three in-phase correlation components ($I_E$, $I_L$, $I_P$) and three quadrature phase correlation components ($Q_E$, $Q_L$, $Q_P$), typically by integration in an integrator 23 over substantially the whole of the PRN code. In the correlation processor 24, a code phase discriminator is calculated as a function of the correlation components and a threshold test applied to the code phase discriminator. A phase match is declared if the code phase discriminator is high and if not, the code generator produces the next series of replicas with a phase shift. A linear phase sweep will eventually result in the incoming PRN code being in phase with that of the locally generated replica and thus code acquisition.

The replica code generator 22 is shown in greater detail in FIG. 3 comprising a code NCO 32, a code generator 31, and an early and late processing unit 33, 34 for processing early and prompt, and prompt and late signals outputted by the code generator respectively. The code NCO is provided with an input signal originating from external to the replica code generator in the form of a code phase increment signal ΔCP per clock cycle from the correlation processor 24 which is used to adjust the frequency of the NCO of the code generator and therefore control the chipping rate of the despreading codes generated. Outputted from the code NCO to the code generator is a clock signal CS1 for clocking the code generator 31 at the data message bit rate and a signal representing the residual code phase RCP measurement in the NCO to both the early and late processing units. The prompt spreading code is provided directly from the prompt output of the code generator 31 whereas the early and late spreading codes are the outputs of the early and late processing units 33, 34 respectively. The early and late processing units 33, 34 receive early and prompt, and prompt and late signals from the code generator respectively, and determine which of the early or prompt, and prompt or late signal samples are used to compose early and late spreading codes respectively, both as a function of the residual code phase RCP measurement of the NCO.

By way of example, the determination of which of the prompt or late signal samples are used to compose a half chip late spreading code as a function of the residual code phase RCP measurement of the NCO is illustrated in detail in FIG. 4. The residual code phase RCP measurement in the NCO is shown together with its relationship to the prompt signal denoted PS whereby the change from 1 to 0 of the residual code phase corresponds to the epochs of the prompt signal. As sampled, the sampled prompt signal denoted SPS does not precisely define the epochs of the chips because of the discontinuities of the sampling instants, denoted by dots.

In order to compose the sampled half chip late spreading code as represented by the signal denoted SLS, for any given prompt/current code chip value, the code generator provides early/previous and late/next code chips values. For samples A to K in the SPS signal, the transposition to the late signal samples A' to K' is shown in table 1 below:

TABLE 1

Composition of the SLS Signal

| Sample (SPS) | SPS sample value | Previous SPS chip value & sample | Residual Code Phase (RCP) 0 to 0.5 | Residual Code Phase (RCP) 0.5 to 1 | SLS sample value |
|---|---|---|---|---|---|
| A | 0 | not shown |  | ✓ | 0 |
| B | 1 | 0 (A) | ✓ |  | 0 |
| C | 1 | 0 (A) | ✓ |  | 0 |
| D | 1 | 0 (A) |  | ✓ | 1 |
| E | 1 | 0 (A) |  | ✓ | 1 |
| F | 0 | 1 (B to E) | ✓ |  | 1 |
| G | 0 | 1 (B to E) | ✓ |  | 1 |
| H | 0 | 1 (B to E) |  | ✓ | 0 |
| I | 0 | 1 (B to E) |  | ✓ | 0 |
| J | 1 | 0 (F to I) | ✓ |  | 0 |
| K | 1 | 0 (F to I) |  | ✓ | 1 |

For example, at sampling instant C, the current code chip value is 1, and the previous code chip value was 0, therefore, as the residual code-phase is less than 0.5 (which corresponds to half a chip), the value of the previous code chip is used for the late signal sample C'. Similarly, at sampling instant D, the residual code-phase is greater than 0.5 and therefore the value of the prompt code chip is used for the late signal sample D'.

It is noteworthy that there may be either 3 or 4 samples per chip depending on the relationship between the code phase and the sampling frequency, and that one of SPS signal samples F to I is missing from the corresponding low chip in the SLS signal containing H' to J'. Other early-late spacings can be implemented by altering the threshold on the residual code-phase.

In order to generate either early or late spreading codes from a prompt spreading code with only a very small time shift, the sampling rate is selected as a function of the chipping rate in order to optimise the resultant, time shifted signal. In particular, the sampling rate is selected based on the continued fraction expansion of a fraction $\theta$ having the chipping rate k as the numerator and the sampling rate $2^B$ as the denominator such that no large integers occur in the continued fraction expansion:

$$\theta = \frac{k}{2^B} = \frac{\text{chipping rate}}{\text{sampling rate}}$$

where k is the sum word added whenever the NCO is clocked by the sample clock, and B is the resolution of the NCO in bits. For the purpose of the following analysis, the continued fraction expansion of any given fraction having a numerator n and a denominator d is as follows:

$$\frac{n}{d} = a1 + 1/(a2 + 1/(a3 + 1/(a4 + \ldots)))$$

where an are integers. For example:

$$\frac{11}{64} = 1/(5 + 1/(1 + 1/(4 + 1/2)))$$

which the same as:

$$\frac{11}{64} = \cfrac{1}{5 + \cfrac{1}{1 + \cfrac{1}{4 + \cfrac{1}{2}}}}$$

The sequence of residual code phase measurements of a sample stream is related to the ratio of the chipping rate and the sampling rate, i.e. $\theta$. For example, if $\theta = 5/8$, the residual code-phase follows the sequence 0, 5/8, 2/8, 7/8, 4/8, 1/8, 6/8, 3/8, 0 . . . , i.e. repeating in cycles of eight. Thus, when generating a time shifted signal from a prompt signal, it is desirable that at any time in the sequence, there is approximately the same number of fractional parts of the sequence in the range of 0 up to but not including 1/2 as in the range 1/2 up to but not including 1. In the example above, after the NCO has been clocked five times, two fractional parts lie in the first range (1/8 and 2/8) and three fractional parts lie in the second range (4/8, 5/8, 7/8). Therefore, the absolute value of the bias after five samples is 3−2=1. Large values of the bias cause both the early and the late signals to be consistently shifted in time (either forwards or backwards) by the same amount, and in the case of a positioning system, will eventually lead to range errors.

Since the entire sequence of fractional parts repeats in cycles of $2^B$, we need only be concerned with the maximum absolute value of the bias over the first f members of the sequence, where $1 \leq f \leq 2^B$. This maximum value may be defined as M(B, k). L(B, k) may be defined as the largest integer in the continues fraction expansion of $\theta = k/2^B$, for example, L(11,6)=5 since the largest integer in the expansion of 11/64 is 5. Referring to curves 51 and 52 of FIG. 5 which show M(14, k) and L(14, k) plotted against k respectively, it can be seen that the largest integer in the continues fraction expansion of $\theta$ coincides with the maximum absolute value of the bias.

Having established that it is large integers in the continued fraction expansion of $\theta$ that are the cause of our problem, it is then possible to avoid them. For example, if the chipping rate is fixed set by front-end considerations, as when generating a despreading code for correlation with a received code, the value of B, i.e. the sampling rate, is varied such that L(B, k) is minimised. Similarly, if on the other hand, the chipping rate is specified only over a frequency rang, for example corresponding to the expected range of received chipping rates taking into account possible Doppler shift observed on received signals, a value of B may be chosen so as to that for the contiguous range of values of k, L(B, k) is less than a predetermined threshold.

In addition to avoiding large maximum values of bias during the correlation, it would also be desirable to avoid any cumulative bias. In theory, this could be done by correlating over an integer multiple of $2^B$ samples (B being the NCO resolution), however, in order to obtain adequate code phase resolution, B must typically exceed 25. This then necessitates a correlation over an undesirably long period of at least several seconds, if not minutes.

As an alternative, it is possible to measure any cumulated bias and to adjust the code phase measurement to compensate for this. For example, consider a correlation over one millisecond at a sample rate of 4.8 MHz. If we wish to create a half chip displacement of the early and late replica signals (i.e. half the time shift of the early and late outputs of the code generator 31), then we would expect the early and late signals to be composed of 2400 of each of the early and prompt, and prompt and late signal samples outputted by the code generator respectively. The bias counter is a count of the deviation from this caused by the interaction between the sampling rate and the chipping rate. If say the chipping rate is 0.96 MHz (i.e. $\frac{1}{5}^{th}$ of 4.8 MHz), then we would see the proportion of the early signal generated from each of the early and prompt outputs of the code generator 32 to range between $\frac{2}{5}^{ths}$ and $\frac{3}{5}^{ths}$. In the worse case of $\frac{1}{10}^{th}$ chip error, we would see a bias counter value of 480 ($\frac{3}{5}$*4800–$\frac{2}{5}$*4800) (or –480 depending on the direction of the displacement). In reverse, with a known value of bias for time shifted early and late replica codes, the code phase measurement derived from them may be adjusted accordingly.

With reference to FIGS. 2 and 3 showing the above described embodiment, such bias measurement is done by the early processing unit 33 of the replica code generator 22 outputting a bias counter BC signal to the receiver processor 14 which is used in the receiver processor to adjust the code phase measurement. It is noteworthy that when tapping the early and late replicas codes from the same code generator, the bias will be present in both the early and late replica signals and therefore it is possible to only monitor one of the early or late processing units to obtain the bias value for both early and late replica signals.

In the GPS receiver of the type shown schematically in FIGS. 1 and 2, the pre-processor 11 will be typically implemented in the form of front end analogue circuitry with the digital receiver channels 13, the receiver processor 14 and the navigation processor 15 implemented in the form of a general purpose microprocessor or a microprocessor embedded in a GPS application specific integrated circuit (ASIC). Implementation of methods according to the present invention, including the example described above, would be accomplished by appropriate analogue circuitry design and/or microprocessor programming. Of course, such design and programming is well known and would be accomplished by one of ordinary skill in the art of GPS and CDMA communication without undue burden.

Also, at present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS hereafter refers to any global positioning system comprising a plurality of CDMA radio transmitters at different locations and a receiver which determines its location based on the time of arrival of the transmissions of the radio transmitters. Furthermore, whilst the third aspect of the present invention is of particular benefit to the field of GPS, such reference should not be interpreted as limiting the scope of the invention to merely GPS. For example, this aspect of the invention is equally applicable to CDMA communication between mobile cellular telephones and associated networks.

From a reading of the present disclosure, other modifications will be apparent to the skilled person skilled and may involve other features which are already known in the design, manufacture and use of GPS and other spread spectrum signal receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A method of generating a time shifted replica signal from a reference signal comprising a series of samples describing bits of a data message, said bits having a data message bit rate, said samples having a sampling rate greater than the data message bit rate, the method comprising: determining the phases of the reference signal samples with respect to virtual epochs of the data message bits of the reference signal; and composing the time shifted replica signal from the reference signal samples as a function of the phases of the reference signal samples.

2. A method according to claim 1 wherein the phases of the reference signal samples are used to determine which signal samples are to be used to compose the time shifted replica signal.

3. A method according to claim 1 wherein the phases of the reference signal samples are determined using a numerical controlled oscillator.

4. A method according to claim 1 wherein the sampling rate of the replica signal is the same as that of the reference signal.

5. A method according to claim 1 wherein at least one reference signal sample is not present in the time shifted replica signal.

6. A method according to claim 1 wherein at least one reference signal sample is replicated twice in succession in the time shifted replica signal.

7. A method according to claim 1 wherein at least one pair of adjacent replica signal samples positioned either side of a virtual data bit epoch in the time shifted replica signal correspond to a pair of non-adjacent reference signal samples positioned either side of the virtual data bit epoch in the reference signal.

8. A method according to claim 1 wherein the time shifted replica signal is time shifted from the reference signal by an amount not equal to an integer multiple of the time period between adjacent samples.

9. A method according to claim 8 wherein the time shifted replica signal is time shifted from the reference signal by an amount less than the time period between adjacent samples.

10. A method according to claim 1 wherein, to 95% accuracy, a fraction having the data message bit rate as the numerator and the sampling rate as the denominator is expressible by a continued fraction expansion in which the largest integer is less than or equal to 12.

11. A method according to claim 1 wherein, to 95% accuracy, a fraction having the data message bit rate as the numerator and the sampling rate as the denominator is expressible as a continued fraction expansion in which the largest integer is less than or equal to 26.

12. A method according to claim 1 wherein, to 99% accuracy, a fraction having the data message bit rate as the numerator and the sampling rate as the denominator is expressible as a continued fraction expansion in which the largest integer is less than or equal to 26.

13. A method according to claim 1 wherein the reference signal samples describe a pseudorandom noise (PRN) code and the data message bits correspond to the PRN code chips.

14. A signal generator for generating a time shifted replica signal from a reference signal by a method according to claim 1.

15. A method of despreading a target spread spectrum signal containing a pseudorandom noise (PRN) code, said method being based on the method of claim 13, wherein said PRN code chips have a PRN code chipping rate, said method despreading comprising: generating a reference signal comprising a series of samples describing a PRN code corresponding to that contained in the target signal and having a sampling rate at least twice the PRN code chipping rate; generating time shifted, early and late replica signals from the reference signal by the method of claim 13; and correlating the target signal with the time shifted, early and late replica signals.

16. A method according to claim 15 further comprising the steps of measuring the code phase of the target spread spectrum signal when acquired using the generated time shifted, early and late replica signals; and adjusting the code phase measurement to compensate for error in the generated time shifted, early and late replica signals compared to respective ideal early and late replica signals.

17. A spread spectrum signal receiver for despreading a target spread spectrum signal containing a pseudorandom noise (PRN) code by a method according to claim 15.

18. A spread spectrum signal receiver for despreading a spread spectrum signal comprising: a receiver for receiving a target spread spectrum signal containing a pseudorandom noise (PRN) code; a signal generator for generating a reference signal comprising a series of samples describing a PRN code having a PRN code chipping rate, said PRN code corresponding to that contained in the target signal, said series of samples having a sampling rate at least twice the PRN code chipping rate, and for generating time shifted, early and late replica signals from the reference signal by the method of claim 13; and a correlation processor for correlating the target signal with the time shifted, early and late replica signals.

19. A spread spectrum signal receiver according to claim 18 wherein the correlation processor is configured to measure the code phase of the target spread spectrum signal when acquired using the generated time shifted, early and late replica signals, and further configured to adjust the code phase measurement to compensate for error in the generated time shifted, early and late replica signals compared to respective ideal early and late replica signals.

20. A spread spectrum signal receiver according to claim 18 wherein the signal generator comprising a code NCO, a code generator for generating the reference signal, and early and late processing units for generating time shifted, early and late replica signals from the reference signal as outputted by the code generator; wherein the early and late processing units receive early and prompt, and prompt and late signals from the code generator respectively, and determine which of the early or prompt, and prompt or late signal samples are used to generate the time shifted, early and late replica codes respectively, both as a function of the residual code phase measurement of the NCO.

21. A spread spectrum signal receiver according to claim 20 wherein the correlation processor is configured to measure the code phase of the target spread spectrum signal when acquired using the generated time shifted, early and late replica signals, and further configured to adjust the code phase measurement to compensate for error in the generated time shifted, early and late replica signals compared to respective ideal early and late replica signals using an output from at least one of the early and late processing units.

22. A method of generating a time shifted replica signal from a reference signal comprising a series of samples describing bits of a data message, said bits having a data message bit rate, said samples having a sampling rate greater than the data message bit rate, the method comprising composing the time shifted replica signal from the reference signal samples, wherein the sampling rate of the replica signal is the same as that of the reference signal, and wherein at least one reference signal sample is not present in the time shifted replica signal.

* * * * *